(No Model.)
R. F. HALL.
VELOCIPEDE PEDAL.
No. 558,557. Patented Apr. 21, 1896.
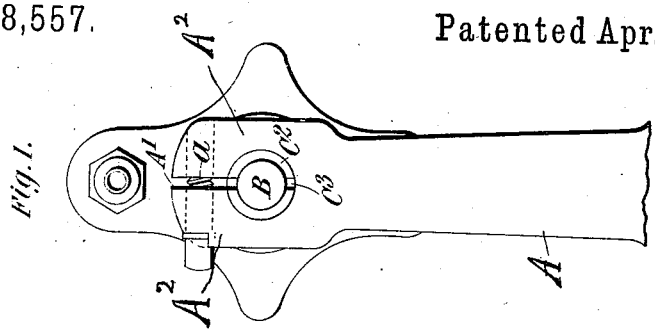
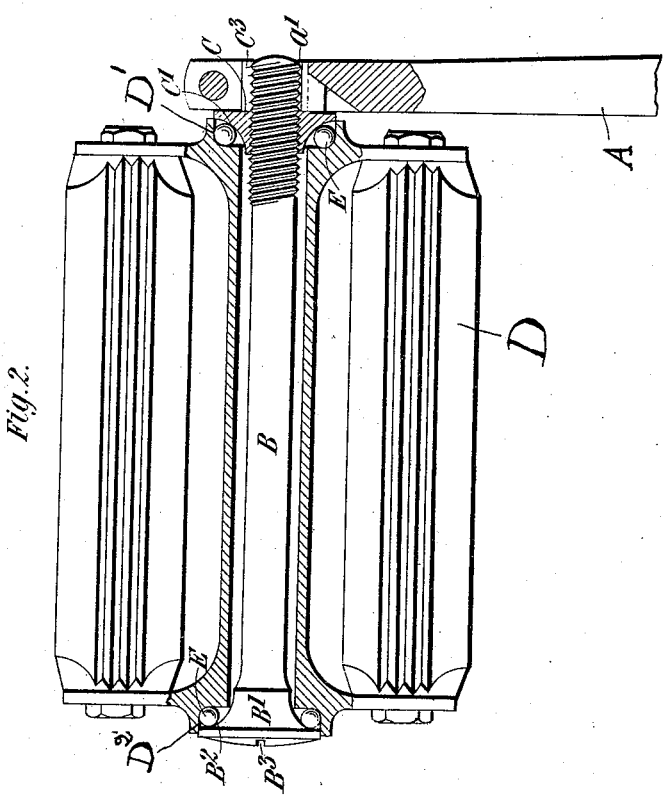
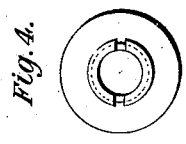
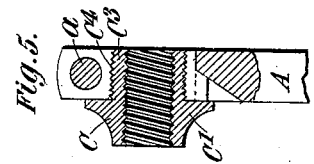
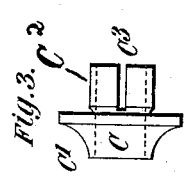
Witnesses:
James H. Cattow
John O. Eaton
Inventor
Robert F. Hall
By Duncan & Page
attys.

UNITED STATES PATENT OFFICE.

ROBERT FREDERICK HALL, OF MOSELEY, ENGLAND.

VELOCIPEDE-PEDAL.

SPECIFICATION forming part of Letters Patent No. 558,557, dated April 21, 1896.

Application filed November 16, 1894. Serial No. 528,994. (No model.)

*To all whom it may concern:*

Be it known that I, ROBERT FREDERICK HALL, managing director of the Cycle Components Manufacturing Company, Limited, a subject of the Queen of Great Britain, residing at Ferndale, Church Road, Moseley, near Birmingham, in the county of Warwick, England, have invented certain new and useful Improvements Relating to Velocipede-Pedals, of which the following is a specification, reference being had to the accompanying drawings.

My invention relates to velocipede-pedals; and has for its object to provide an improved means of securing a pedal-pin to its crank.

According to my invention I construct the crank with a slit or slotted end forming two jaws, which, by means of a screw or bolt, can be caused to approach each other. Between the jaws I provide a hole, into which a sleeve or bush is passed. The said sleeve or bush is slit for a portion of its length and is screw-threaded internally to screw on the end of the pedal-pin. The outer end of the sleeve is suitably shaped to act as a ball-race, as will be hereinafter explained.

In the accompanying drawings, Figure 1 is a side elevation, and Fig. 2 is a plan, partly sectional, showing my improved means for securing the pedal-pin to the crank. Figs. 3, 4, and 5 are detail views, hereinafter explained.

Like letters denote the same parts throughout the drawings.

A is the crank.

B is the pedal-pin.

The end of the crank is slit or slotted, as shown at A', forming two jaws $A^2$ $A^2$, and is furnished with a clamping screw or bolt $a$, by means of which the said jaws can be drawn together.

The pedal-pin B is provided with a head B' at its outer end, the interior flange $B^2$ of which serves as a ball-race. The other end of the pedal-pin is screw-threaded to fit a sleeve C, furnished with a flanged part C', which serves as a second ball-race. The side view of said sleeve C is shown in Fig. 3 and an end view in Fig. 4. The cylindrical part $C^2$ of the sleeve is slit or slotted, as shown at $C^3$, and is received in the hole provided between the jaws at the end of the crank. When the screw $a$ is screwed up, the jaws of the crank are drawn together and the sleeve $C^2$ is tightened on the screwed end of the pedal-pin. The pedal D is provided with ball-races D' and $D^2$ and turns on the balls E E, contained between races $D^2$ and $B^2$ and D' and C'.

To adjust the pedal, all that it is necessary to do is to slack back the screw $a$ and then to screw the pedal-pin B in or out of the sleeve C, as may be required. The pin B is provided with a saw-cut $B^3$ for convenience in turning the same. When the pedal is adjusted, the screw $a$ is tightened to close the split end of the crank and firmly secure the sleeve B on the pedal-pin. I provide a stop $a'$ in the crank, which engages with the slot $C^3$ in the sleeve C and so prevents said sleeve from rotating in the hole in the crank when the pin B is being adjusted.

I sometimes screw-thread the outside of the sleeve or cone C, as shown at $C^4$ in Fig. 5, in which case the hole made for it in the crank must be tapped and the sleeve screwed in, care being taken that the slit or saw-cut in the sleeve is in line with that in the crank. The slit A' may be at the side of the crank instead of at the end.

By my improved arrangement the adjustment of the pedals is very readily and quickly effected. It will be seen also that the bearings are dust-tight and that the entire device is extremely simple.

What I claim is—

The combination of a crank having a slotted end forming two jaws, a clamping-screw for drawing the two said jaws together, a sleeve slotted through a part of its length and provided with a flange constituting a ball-race, said sleeve being inserted in an opening between the jaws of the crank, a pedal-pin screwed into said sleeve and means for preventing the rotation of the sleeve between the jaws of the crank when the pedal-pin is screwed in and out of the sleeve, substantially as and for the purpose specified.

In testimony whereof I have hereunto set my hand this 1st day of November, 1894.

ROBERT FREDERICK HALL.

Witnesses:
BENJAMIN SMALLWOOD,
BERNARD ARNOLD KRINKS.